(12) United States Patent
Reid

(10) Patent No.: US 11,484,952 B2
(45) Date of Patent: Nov. 1, 2022

(54) ILLUMINATED TOOL BIT ASSEMBLY

(71) Applicant: Marc Reid, Sun City, AZ (US)

(72) Inventor: Marc Reid, Sun City, AZ (US)

( * ) Notice: Subject to any disclaimer, the term of this patent is extended or adjusted under 35 U.S.C. 154(b) by 136 days.

(21) Appl. No.: 17/082,212

(22) Filed: Oct. 28, 2020

(65) Prior Publication Data

US 2022/0126378 A1    Apr. 28, 2022

(51) Int. Cl.
*B23B 45/00*  (2006.01)
*F21V 33/00*  (2006.01)
*B23B 51/12*  (2006.01)

(52) U.S. Cl.
CPC ............ *B23B 45/003* (2013.01); *B23B 51/12* (2013.01); *F21V 33/0084* (2013.01); *B23B 2231/04* (2013.01)

(58) Field of Classification Search
CPC ... B23B 45/003; B23B 51/12; B23B 2231/04; F21V 33/0084
See application file for complete search history.

(56) References Cited

U.S. PATENT DOCUMENTS

| | | | | |
|---|---|---|---|---|
| 5,720,542 A | * | 2/1998 | Birge, Jr. ............ | F21V 33/0084 362/120 |
| 6,007,214 A | * | 12/1999 | Shiao ........................ | B25B 9/00 362/120 |
| 6,293,172 B1 | * | 9/2001 | Smith ...................... | B25B 23/18 81/177.2 |
| 6,454,453 B1 | * | 9/2002 | Ambrosio ............... | B25B 23/18 362/120 |
| 7,090,372 B2 | * | 8/2006 | Liao ........................ | F21L 13/00 310/47 |
| 8,820,955 B2 | * | 9/2014 | Dixon ..................... | B25F 5/021 362/119 |
| 9,028,088 B2 | * | 5/2015 | Vanko ...................... | B25F 5/00 362/120 |
| 9,328,915 B2 | * | 5/2016 | Vanko ..................... | B25B 23/18 |
| 9,851,060 B2 | * | 12/2017 | Pathy ..................... | A61B 90/30 |
| 10,220,501 B1 | * | 3/2019 | Davidson ............ | B25B 23/0021 |
| 2015/0049467 A1 | * | 2/2015 | Thompson .............. | B25B 15/02 362/120 |
| 2022/0009064 A1 | * | 1/2022 | Puzio ....................... | F21S 9/04 |

FOREIGN PATENT DOCUMENTS

| | | | | | |
|---|---|---|---|---|---|
| CN | 105881439 | A | * | 8/2016 | |
| DE | 29908349 | U1 | * | 3/2000 | ............. B25B 23/18 |
| KR | 20200102330 | A | * | 8/2020 | |
| WO | WO-2015035732 | A1 | * | 3/2015 | ......... B23B 31/1238 |

* cited by examiner

*Primary Examiner* — Eric A. Gates

(57) ABSTRACT

An illuminated tool bit assembly for illuminating a work area for a drill without casting a shadow includes a tool bit that can be inserted into a chuck of a power drill. The tool bit has a well integrated therein for insertably receiving an additional tool bit. A cylinder is provided and the tool bit extends through the cylinder. A lighting unit is integrated into the cylinder to emit light outwardly from the cylinder when the lighting unit is turned on. In this way the lighting unit can illuminate the work area without casting a shadow.

10 Claims, 4 Drawing Sheets

ILLUMINATED TOOL BIT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to tool bit devices and more particularly pertains to a new tool bit device for illuminating a work area for a drill without casting a shadow.

(2) Description of Related Art Including Information Disclosed Under 37 CFR 1.97 and 1.98

The prior art relates to tool bit devices including a variety of light emitters that are attached to a body of a power drill. The prior art discloses a quick connect chuck that has light emitters being integrated therein for illuminating a work area.

BRIEF SUMMARY OF THE INVENTION

An embodiment of the disclosure meets the needs presented above by generally comprising a tool bit that can be inserted into a chuck of a power drill. The tool bit has a well integrated therein for insertably receiving an additional tool bit. A cylinder is provided and the drill bit extends through the cylinder. A lighting unit is integrated into the cylinder to emit light outwardly from the cylinder when the lighting unit is turned on. In this way the lighting unit can illuminate the work area without casting a shadow.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
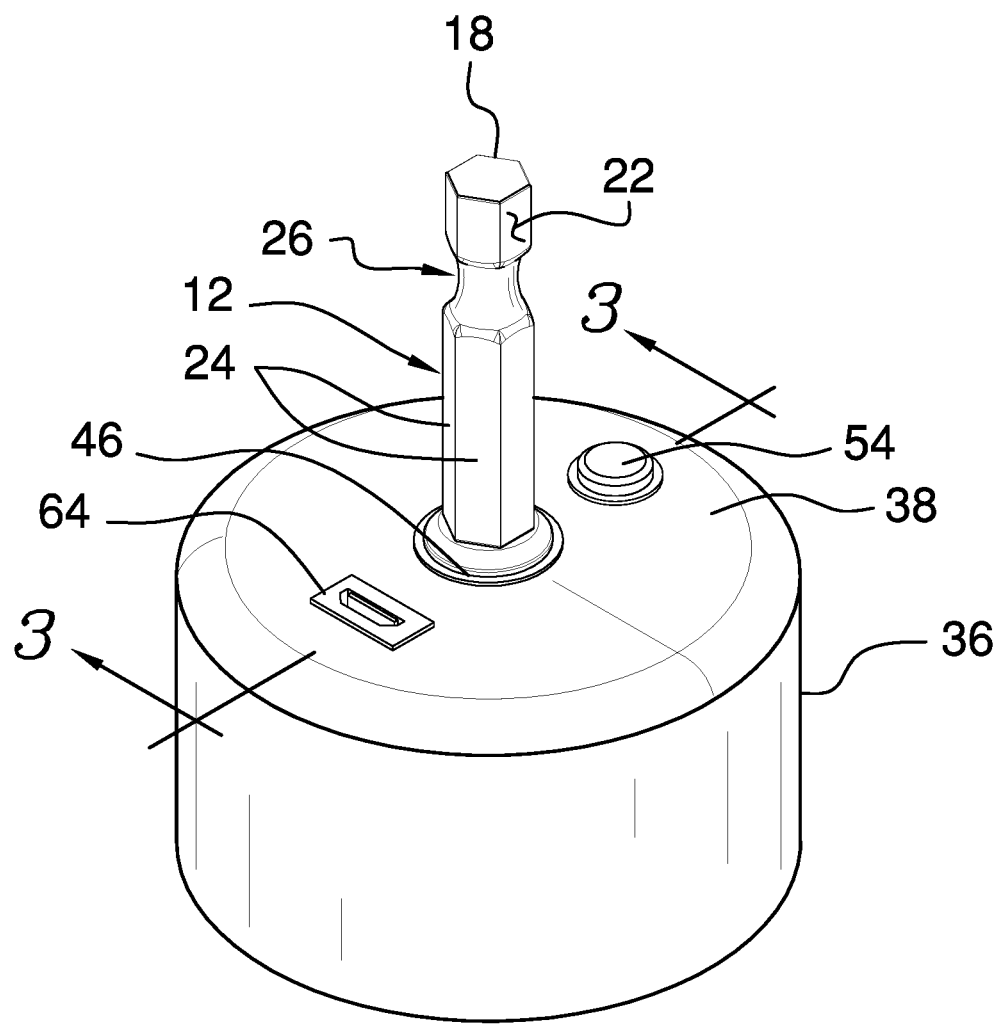
FIG. 1 is a top perspective view of an illuminated drill chuck assembly according to an embodiment of the disclosure.
Figure 2:
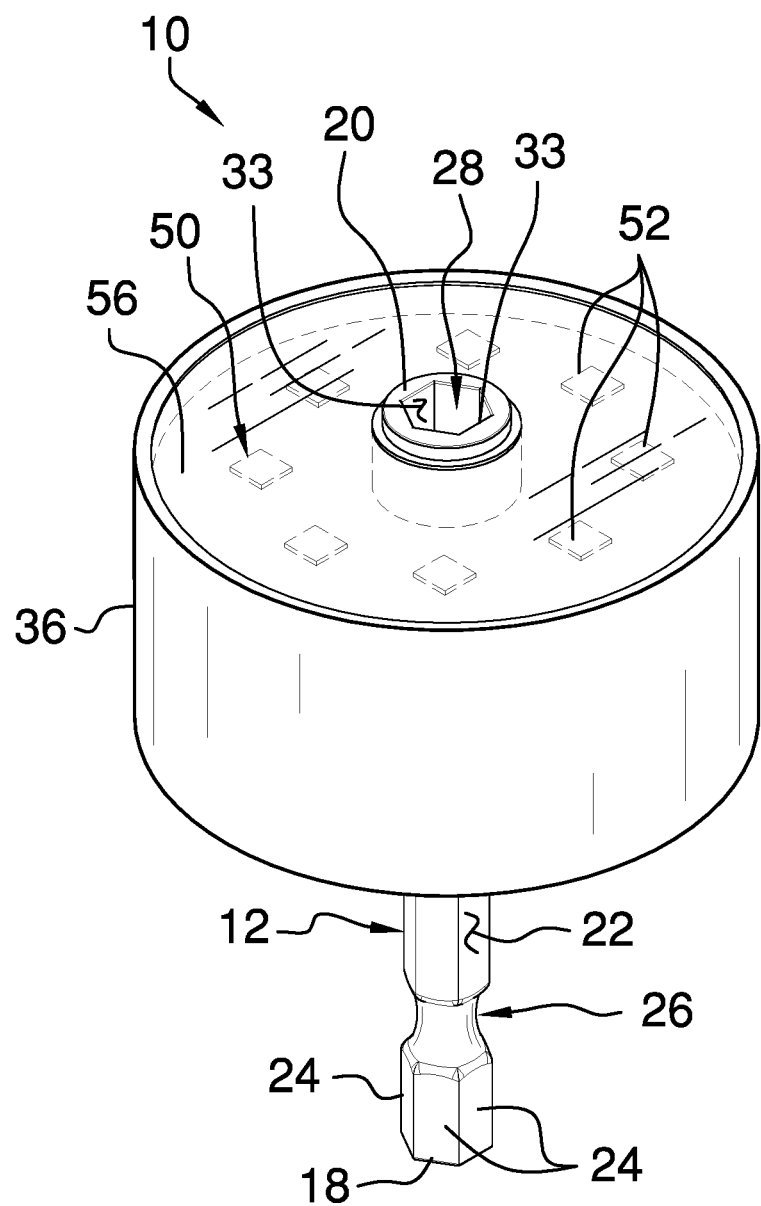
FIG. 2 is a bottom perspective view of an embodiment of the disclosure.
Figure 3:
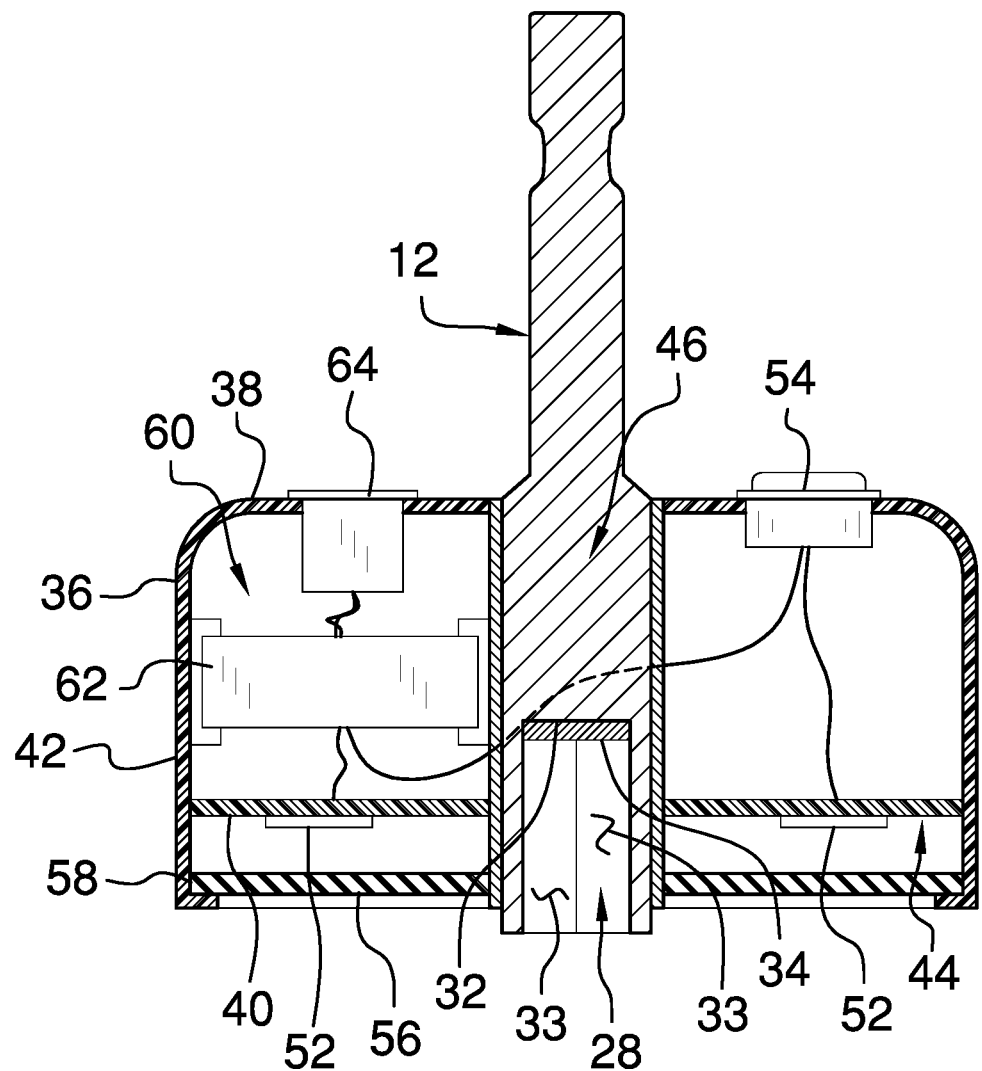
FIG. 3 is a cross sectional view taken along line 3-3 of FIG. 1 of an embodiment of the disclosure.
Figure 4:
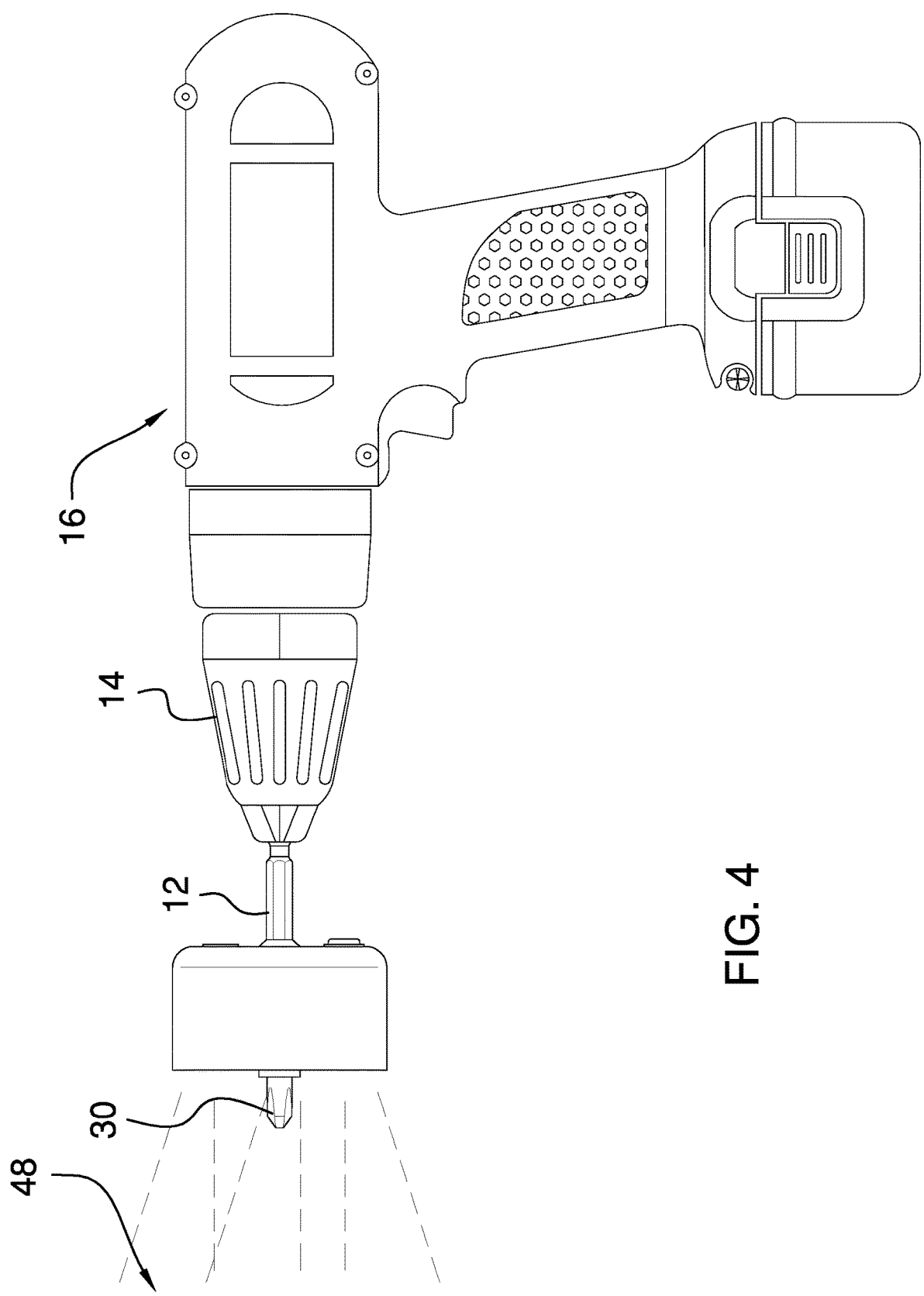
FIG. 4 is a perspective in-use view of an embodiment of the disclosure.

With reference now to the drawings, and in particular to FIGS. 1 through 4 thereof, a new tool bit device embodying the principles and concepts of an embodiment of the disclosure and generally designated by the reference numeral 10 will be described.

As best illustrated in FIGS. 1 through 4, the illuminated tool bit assembly 10 generally comprises a tool bit 12 that can be inserted into a chuck 14 of a power drill 16. The tool bit 12 has a first end 18, a second end 20 and an outer surface 22 extending therebetween. The outer surface 22 has a plurality of intersecting sides 24 such that the 414 tool bit 12 has a hexagonal cross section taken along a line extending through the first end 18 and the second end 20 to facilitate the chuck 14 to grip the tool bit 12. Additionally, the outer surface 22 has a concave portion 26 that is spaced from the first end 18.

The second end 20 has a well 28 extending toward the first end 18 to receive an additional tool bit 30 thereby facilitating the power drill 16 to rotate the additional tool bit 30. Additionally, the well 28 has a lower bounding surface 32 and a plurality of lateral bounding surfaces 33 such that the well 28 has a hexagonal shape for accommodating tool bits. A magnet 34 is positioned on the lower bounding surface 32 of the well 28 to magnetically engage the additional tool bit 30. In this way the additional tool bit 30 is releasably retained in the well 28.

A cylinder 36 is provided which has the tool bit 12 extending therethrough. The cylinder 36 has a top wall 38, a bottom wall 40 and an outer wall 42 extending therebetween, and the outer wall 42 extends beyond the bottom wall 40 to define a well 44 extending toward the top wall 38. The cylinder 36 has a hole 46 extending through the top wall 38 and the bottom wall 40, and the hole 46 is centrally positioned on the cylinder 36. The hole 46 has the tool bit 12 extending therethrough and the second end 20 of the tool bit 12 is spaced from the bottom wall 40. Additionally, the first end 18 of the tool bit 12 is spaced from the top wall 38 such that the bottom wall 40 is directed toward a work area 48 when the tool bit 12 is inserted into the chuck 14 of the power drill 16.

A lighting unit 50 is integrated into the cylinder 36 and the lighting unit 50 emits light outwardly from the cylinder 36 when the lighting unit 50 is turned on thereby facilitating the work area 48 to be illuminated. In this way the lighting unit 50 enhances lighting the work area 48 as compared to lights that are commonly integrated into power drills. Lights that are integrated into power drills cast a shadow on the work area 48 that is created by a tool bit or other accessory that is inserted into the power drill.

The lighting unit 50 comprises a plurality of light emitters 52 that is each coupled to the bottom wall 40 to emit light outwardly from the bottom wall 40 thereby illuminating the work area 48. Each of the light emitters 52 may comprise an LED or other type of electronic light emitter. The lighting unit 50 includes a switch 54 that is movably integrated into the top wall 38 of the cylinder 36 such that the switch 54 can be manipulated by a user. The switch 54 is electrically coupled to each of the light emitters 52 for turning the light emitters 52 on and off. Additionally, the switch 54 may comprise a spring loaded button that is biased into an off position and that is releasably retained in an on position when the switch 54 is depressed.

The lighting unit 50 includes a lens 56 that has a perimeter edge 58 and the perimeter edge 58 is coupled to the outer wall 42 of the cylinder 36. Moreover, the lens 56 is spaced from the bottom wall 40 of the cylinder 36 having the lens 56 lying on a plane that is oriented coplanar with the bottom wall 40. The lens 56 is comprised of a translucent material such that the lens 56 passes light from the light emitters 52 therethrough. Additionally, the light emitters 52 are spaced apart from each other and are distributed around the tool bit 12 such that the tool bit 12 does not cast a shadow on the work area 48.

The lighting unit 50 includes a power supply 60 that is integrated into the cylinder 36 and the power supply 60 is electrically coupled to the switch 54. The power supply 60 comprises at least one rechargeable battery 62 that is positioned within the cylinder 36. Additionally, the at least one rechargeable battery 62 is electrically coupled to the switch 54. The power supply 60 includes a charge port 64 that is recessed into the top wall 38 of the cylinder 36 to receive a power cord from a charger. The charge port 64 may comprise a micro usb port or other type of conventional charge port. Additionally, the charge port 64 is electrically coupled to the at least one rechargeable battery 62 for charging the at least one rechargeable battery 62.

In use, the first end 18 of the tool bit 12 is inserted into the chuck 14 of the power drill 16 thereby facilitating the additional tool bit 30, or other drill accessory, to be inserted into the second end 20 of the tool bit 12. The switch 54 is manipulated to turn on the light emitters 52 to subsequently illuminate the work area 48. In this way the work area 48 is illuminated without casting a shadow onto the work area 48.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An illuminated tool bit assembly for illuminating a work area for a drill, said assembly comprising:
   a tool bit being configured to be inserted into a chuck of a power drill, said tool bit having a well being integrated therein for insertably receiving an additional tool bit;
   a cylinder having said tool bit extending therethrough;
   a lighting unit being integrated into said cylinder wherein said lighting unit is configured to emit light outwardly from said cylinder when said lighting unit is turned on thereby facilitating the work area to be illuminated; and
   wherein said cylinder has a top wall, a bottom wall and an outer wall extending therebetween, said outer wall extending beyond said bottom wall to define a well extending toward said top wall, said cylinder having a hole extending through said top wall and said bottom wall, said hole being centrally positioned on said cylinder.

2. The assembly according to claim 1, wherein said tool bit has a first end, a second end and an outer surface extending therebetween, said outer surface having a plurality of intersecting sides such that said tool bit has a hexagonal cross section taken along a line extending through said first end and said second end wherein said outer surface is configured to facilitate the chuck to grip said tool bit, said outer surface having a concave portion being spaced from said first end.

3. The assembly according to claim 2, wherein said second end has said well extending toward said first end wherein said well is configured to receive the additional tool bit thereby facilitating the power drill to rotate the additional tool bit, said well having a lower bounding surface.

4. The assembly according to claim 3, further comprising a magnet being positioned on said lower bounding surface of said well wherein said magnet is configured to magnetically engage the additional tool bit for releasably retaining the additional tool bit in said well.

5. The assembly according to claim 1, wherein said tool bit has a first end and a second end, said tool bit extends through said hole, said second end of said tool bit being spaced from said bottom wall, said first end of said tool bit being spaced from said top wall wherein said bottom wall is configured to be directed toward a work area when said tool bit is inserted into the chuck of the power drill.

6. The assembly according to claim 1, wherein said lighting unit comprises a plurality of light emitters, each of said light emitters being coupled to said bottom wall wherein each of said light emitters is configured to emit light outwardly from said bottom wall thereby illuminating the work area.

7. The assembly according to claim 6, wherein said lighting unit includes a switch being movably integrated into said top wall of said cylinder wherein said switch is configured to be manipulated by a user, said switch being electrically coupled to each of said light emitters for turning said light emitters on and off.

8. The assembly according to claim 7, wherein said lighting unit includes a power supply being integrated into said cylinder, said power supply being electrically coupled to said switch, said power supply comprising:
- at least one rechargeable battery being positioned within said cylinder, said at least one rechargeable battery being electrically coupled to said switch; and
- a charge port being recessed into said top wall of said cylinder wherein said charge port is configured to receive a power cord from a charger, said charge port being electrically coupled to said at least one rechargeable battery for charging said at least one rechargeable battery.

9. The assembly according to claim 6, wherein said lighting unit includes a lens having a perimeter edge, said perimeter edge being coupled to said outer wall of said cylinder such that said lens is spaced from said bottom wall of said cylinder having said lens lying on a plane being oriented coplanar with said bottom wall, said lens being comprised of a translucent material wherein said lens is configured to pass light from said light emitters therethrough.

10. An illuminated tool bit assembly for illuminating a work area for a drill, said assembly comprising:
- a tool bit being configured to be inserted into a chuck of a power drill, said tool bit having a first end, a second end and an outer surface extending therebetween, said outer surface having a plurality of intersecting sides such that said tool bit has a hexagonal cross section taken along a line extending through said first end and said second end wherein said outer surface is configured to facilitate the chuck to grip said tool bit, said outer surface having a concave portion being spaced from said first end, said second end having a well extending toward said first end wherein said well is configured to receive an additional tool bit thereby facilitating the power drill to rotate the additional tool bit, said well having a lower bounding surface;
- a magnet being positioned on said lower bounding surface of said well wherein said magnet is configured to magnetically engage the additional tool bit for releasably retaining the additional tool bit in said well;
- a cylinder having said tool bit extending therethrough, said cylinder having a top wall, a bottom wall and an outer wall extending therebetween, said outer wall extending beyond said bottom wall to define a well extending toward said top wall, said cylinder having a hole extending through said top wall and said bottom wall, said hole being centrally positioned on said cylinder, said hole having said tool bit extending therethrough, said second end of said tool bit being spaced from said bottom wall, said first end of said tool bit being spaced from said top wall wherein said bottom wall is configured to be directed toward a work area when said tool bit is inserted into the chuck of the power drill; and
- a lighting unit being integrated into said cylinder wherein said lighting unit is configured to emit light outwardly from said cylinder when said lighting unit is turned on thereby facilitating the work area to be illuminated, said lighting unit comprising:
  - a plurality of light emitters, each of said light emitters being coupled to said bottom wall wherein each of said light emitters is configured to emit light outwardly from said bottom wall thereby illuminating the work area;
  - a switch being movably integrated into said top wall of said cylinder wherein said switch is configured to be manipulated by a user, said switch being electrically coupled to each of said light emitters for turning said light emitters on and off;
  - a lens having a perimeter edge, said perimeter edge being coupled to said outer wall of said cylinder such that said lens is spaced from said bottom wall of said cylinder having said lens lying on a plane being oriented coplanar with said bottom wall, said lens being comprised of a translucent material wherein said lens is configured to pass light from said light emitters therethrough; and
  - a power supply being integrated into said cylinder, said power supply being electrically coupled to said switch, said power supply comprising:
    - at least one rechargeable battery being positioned within said cylinder, said at least one rechargeable battery being electrically coupled to said switch; and
    - a charge port being recessed into said top wall of said cylinder wherein said charge port is configured to receive a power cord from a charger, said charge port being electrically coupled to said at least one rechargeable battery for charging said at least one rechargeable battery.

* * * * *